(12) United States Patent
Meyer et al.

(10) Patent No.: US 8,821,060 B2
(45) Date of Patent: Sep. 2, 2014

(54) PROFILE OF INTERFACING PROJECTIONS

(71) Applicant: Airbus Operations Limited, Bristol (GB)

(72) Inventors: Jonathan Meyer, Bristol (GB); Daniel Johns, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/785,813

(22) Filed: Mar. 5, 2013

(65) Prior Publication Data

US 2013/0183082 A1 Jul. 18, 2013

Related U.S. Application Data

(62) Division of application No. 12/729,659, filed on Mar. 23, 2010, now Pat. No. 8,387,229.

(30) Foreign Application Priority Data

Mar. 25, 2009 (GB) .................................. 0905132.7

(51) Int. Cl.
*B32B 9/04* (2006.01)
*C09J 5/00* (2006.01)
*B32B 15/04* (2006.01)
*B29C 65/00* (2006.01)
*B21D 39/00* (2006.01)
*B29K 63/00* (2006.01)
*B29C 35/02* (2006.01)
*B64C 1/00* (2006.01)
*B29K 307/00* (2006.01)

(52) U.S. Cl.
CPC . *B32B 9/041* (2013.01); *C09J 5/00* (2013.01); *B32B 15/043* (2013.01); *Y02T 50/43* (2013.01); *B29C 66/742* (2013.01); *Y02T 50/433* (2013.01); *B29C 66/43421* (2013.01); *B29K 2063/00* (2013.01); *B29C 66/721* (2013.01); *B29C 35/02* (2013.01); *B29C 66/30321* (2013.01); *B64C 2001/0072* (2013.01); *C09J 2400/163* (2013.01); *B29K 2307/00* (2013.01)
USPC .......................................... 403/266; 29/521

(58) Field of Classification Search
USPC ........... 29/523, 521, 524, 428, 420, 458, 469, 29/423; 403/291, 266; 156/60; 428/457, 428/411.1, 688, 119, 161; 264/135
See application file for complete search history.

(56) References Cited

U.S. PATENT DOCUMENTS 3,011,226 A * 12/1961 Menge .......................... 411/466
6,183,838 B1 * 2/2001 Kannankeril ................. 428/119
2009/0185340 A1 * 7/2009 Ji et al. .................... 361/679.21

* cited by examiner

Primary Examiner — John C Hong
(74) Attorney, Agent, or Firm — Lowe Hauptman & Ham, LLP

(57) ABSTRACT

A method of joining a first component to a second component, the method comprising preparing the first component by forming an array of projections extending from a bond surface of the first component, each projection having a base, a tapered tip and a tapered overhang beneath the tip, wherein the overhang has an undercut surface which is inclined and faces towards the local bond surface; bringing the components together so as to embed the projections in the second component; and hardening the second component after the array of projections has been embedded into it. Also, a joint so formed.

4 Claims, 6 Drawing Sheets

US 8,821,060 B2

PROFILE OF INTERFACING PROJECTIONS

RELATED APPLICATIONS

The present application is a divisional of U.S. application Ser. No. 12/729,659, filed Mar. 23, 2010 and is based on, and claims priority from, British Application Number GB0905132.7, filed Mar. 25, 2009, the disclosure of which is hereby incorporated by reference herein in its entirety.

FIELD OF THE INVENTION

The present invention relates to a method of joining a component to another component; and a joint so formed.

BACKGROUND OF THE INVENTION

Joining between metallic or thermoplastic and composite components is currently approached in a number of ways, each with its own limitations.

The use of fasteners is commonplace but tends to result in de-lamination around fastener holes. Fastener holes are often difficult to drill in composites and significant reinforcement around fastener holes may be required, leading to increased weight. Fastened joints tend to be particularly weak in the pull-through direction (that is, the direction of axial load through the fastener). As such, fastened joints are not well suited to many aerospace applications.

Adhesive bonds are an increasingly common means of joining metallic components to composite laminates, however these perform poorly in peel, tension and cleavage, and tend to fail with little or no warning. Their weakness in peel and in tension makes bonded joints similarly limited in their application within conventional aerospace structures. Any mitigation for the poor performance in peel or tension tends to result in large bond surface areas, with the associated weight penalties that go with this.

WO 2004/028731 A1 describes a method by which surface features are generated by using a 'power-beam' such as an electron beam, in order to 'flick-up' surface material on a metallic component to sculpt protruding features that are intended to increase bond surface area and improve bond strength when incorporated into the matrix of a co-cured laminate. The displacement of surface material to create the protruding features is likely to generate crack initiators that will adversely affect the fatigue life of the component. Also, it is difficult to optimise the profile and shape of the surface features.

WO 2008/110835 A1 describes a method by which surface features are "grown" on a bond surface of a component in a series of layers by an additive fabrication process. The profile and shape of the surface features can be controlled so as to tailor the performance of the joint, particularly in tension and peel. Each surface feature may have a pointed tip such that the surface features may easily be embedded into a series of laminate plies draped successively over the bond surface. Each surface feature may also include a part having an overhanging edge such that the component may be used in a joint that requires enhanced pull-off (tensile) strength.

SUMMARY OF THE INVENTION

A first aspect of the invention provides a method of joining a first component to a second component, the method comprising: preparing the first component by forming an array of projections extending from a bond surface of the first component, each projection having a base, a tapered tip and a tapered overhang beneath the tip, wherein the overhang has an undercut surface which is inclined and faces towards the local bond surface; bringing the components together so as to embed the projections in the second component; and hardening the second component after the array of projections has been embedded into it.

A second aspect of the invention provides a joint formed by the method of the first aspect.

It has been observed that the geometry of prior art projections, which have a straight cut overhang parallel with the bond surface (i.e. the undercut surface is parallel with the bond surface), produce a stress concentration beneath the overhang. This can lead to premature failure of the joint due to failure of the component in which the projections are embedded. These straight cut overhangs can also be difficult to manufacture. The present invention is advantageous in that the projection geometry is such that the tapered overhang has an undercut surface which is inclined and faces towards the bond surface, which improves manufacturability and reduces stress concentrations.

Preferably, the base of each projection tapers towards the overhang. In this way, a "waist" is formed where the bottom of the overhang meets the top of the base. The value of the cross-sectional area of the waist influences the tensile strength of the projection (provided this area is greater than that of the base where it meets the bond surface). The ratio of the cross-sectional area of the top of the overhang to that of the bottom of the overhang influences the pull-through strength of the joint, due to failure in the second component. This ratio (which effectively defines the relative extent of the overhang) is preferably at least 1.2:1, more preferably at least 1.5:1, and most preferably between 1.5:1 to 2:1 to ensure that the joint fails by tensile failure in the projection rather than pull-through failure in the second component. This failure mode is more predictable and reduces the variance in the test results which improves the "B-Basis allowable" (a statistical design 'strength' measure). At a ratio of around 1.2:1 pull-though failure becomes the dominant failure mode, which will improve ease of assembly (i.e. it becomes easier to embed the projections in the second component) but the strength of the joint becomes compromised. The taper angle of the overhang also influences the pull-through strength of the joint.

The taper angle of the tip influences the ease of assembly of the joint—a more pointed tip improving the ease of embedding the projections into the second component. The cross-sectional area of the base where it meets the bond surface influences the shear strength of the projection, and hence of the joint. The ratio of the projection height to this base area (called the aspect ratio) influences the stiffness of the projection. The lower the aspect ratio, the stiffer the projection. A more flexible projection will have a higher aspect ratio. Typically, the aspect ratio varies between approximately 2 and 6. The aspect ratio of the projections may be increased or decreased to give the desired properties, but is preferably at least 2.

The above parameters are made with reference to the centreline of the projection. Each projection may have either a linear centreline, or a curved centreline. The centreline of each projection is either perpendicular to the bond surface at its intersection with the bond surface, or forms an oblique angle with the bond surface at its intersection with the bond surface.

Preferably, each projection is rotationally symmetric about its centreline. Each projection may have a frustoconical base, a conical tip, and an inverted frustoconical overhang between the base and the tip.

Preferably, the projections are grown on the bond surface in a series of layers, each layer being grown by directing energy and/or material to the bond surface. Suitable additive fabrication techniques may be a "powder bed" process (in which a series of layers of powder are deposited on the bond region and selected parts of each bed are fused by a power beam) or "powder feed" process (in which a directed stream of powder is deposited on selected parts of the bond region and then fused by a power beam, such as a laser or electron beam). Alternatively the projections may be formed by friction welding a set of projections onto the bond surface. Yet further, the projections may be formed by fused deposition modelling (in which hot plastic is extruded through a nozzle).

The first component may be formed from a metallic material (such as Titanium or stainless steel); a thermoplastic material such as polyetheretherketone (PEEK); or any other suitable material. The second component may be a fibre reinforced laminate component formed in a series of layers.

The first component and the second component are preferably brought together by draping successive layers which will form the second component over the first component. The draping may be performed manually or a computer controlled tape laying machine may be used. A soft roller may be required to adequately embed the projections of the first component in each layer of the second component. The first component may be set in a mould tool over which the layers are draped. Alternatively, the first component may be rolled, or otherwise moved, over one or more of the layers so as to embed the projections in the layers.

Each fibre layer of the second component may be laid up as a dry fibre layer to which resin is infused after the projections are embedded in the layer. Alternatively, the fibre layer may be pre-impregnated with the resin, a so-called "pre-preg", in which the projections are embedded. After embedding the projections in the layer and infusing resin, if necessary, the fibre reinforced composite layer may need to be cured. The composite layers may be, for example, carbon fibre reinforced plastic (CFRP), glass fibre reinforced plastic (GFRP), or Aramids such as Kevlar.

Alternatively, the second component may be a thermoplastic such as polyetheretherketone (PEEK). The thermoplastic may need to be softened by heating to make it sufficiently flexible prior to embedding the projections. The thermoplastic may be hardened by leaving it to cool after embedding the projections.

Preferably, the second component is co-cured with the first component after the projections of the first component are embedded in the second component. If the second component includes a plurality of layers then each layer may be cured separately on the first component, or curing may be performed after a batch, or all, of the layers of the second component have been laid up on the first component.

The projections may be formed from the same material as the first component, or they may be formed from a different material.

The joint may be used to join structural components, for instance in an aerospace application. For instance the joint may be used to join a reinforcing plate, floating rib foot, or stringer to a panel such as a wing or fuselage cover. Alternatively, the joint may be used to join adjacent layers in a laminate structure.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
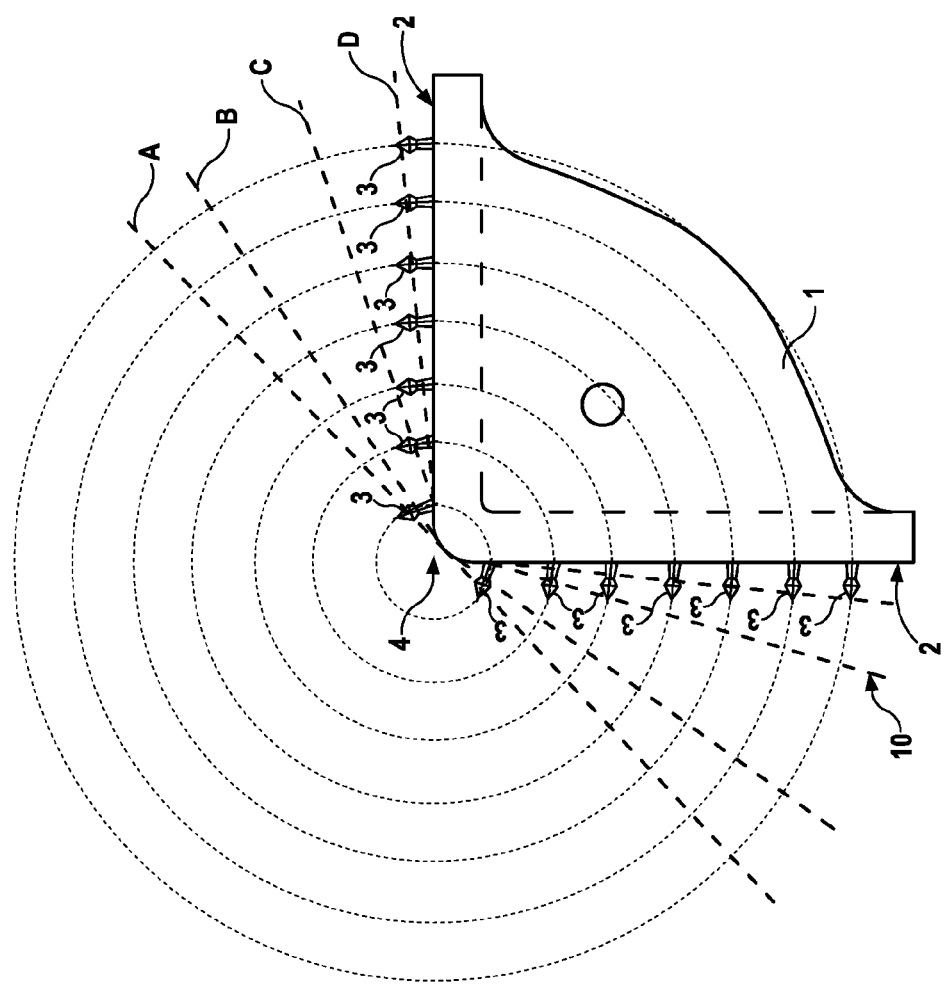
FIG. 1 illustrates a bracket component having an array of projections of varying orientation.

A metallic corner bracket component 1 shown in FIG. 1 comprises an outer bond surface 2. An array of surface features or projections 3 extend from the bond surface 2. As can be seen in FIG. 1, the projections 3 of one row of the array are distributed substantially evenly over the bond surface, leaving only a small space in the region of highest curvature at the apex 4 without projections 3. The bracket component 1 is intended to be joined to a laminate composite component by draping successive plies of the laminate over the bond surface 2 of the bracket component 1, such that the projections 3 become embedded in the plies to form a hybrid part. To reduce the tendency for the projections 3 to tear through the laminate plies during draping, the orientation of the projections 3 varies across the bond surface 2. The orientation of the projections 3 is calculated based on a predicted orientation of a virtual ply 10, as the ply is moved from positions A through D during draping, as shown in FIG. 1.

Figure 2:
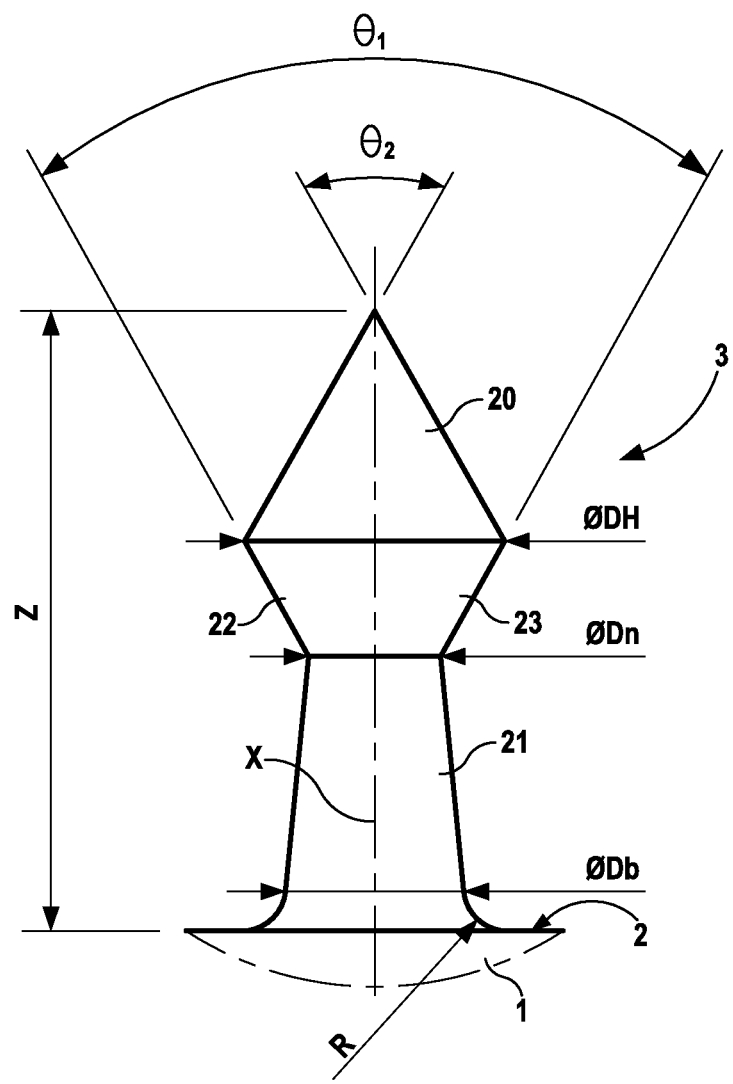
FIG. 2 illustrates a projection in detail.

With reference to FIG. 2, the projections 3 each have a tapered tip 20, a base 21, an overhang 22, and a centreline X. The projection shown in FIG. 2 is rotationally symmetric about the centreline X, and the centreline is linear and oriented perpendicularly to the bond surface 2 of the bracket component 1. The tip 20 is a cone, the base 21 is a frusto-cone, and the overhang 22 is an inverted frusto-cone. The overhang 22 has an undercut surface 23 which is inclined and faces towards the local bond surface 2. The overhang 22 has a taper angle $\theta_1/2$ and the tip has a taper angle $\theta_2/2$ (the taper angle being measured on each side of the centreline X). The angle of inclination of the undercut surface 23 with respect to the bond surface 2 is $90\theta_1/2$ degrees in this example, as the centreline X is normal to the bond surface 2. The conical tip 20 has a base diameter DH. The frusto-conical base 21 has a top diameter Dn where it meets the bottom of the inverted frusto-conical overhang 22. The frusto-conical base 21 has a base diameter Db at (or near) the bond surface 2. A radius R is formed at the intersection of the base 21 with the bond surface 2 to reduce local stress concentrations, and so the diameter Db is measured just above this radius R. The projection 3 has a height Z.

Whilst the projection 3 shown in FIG. 2 is rotationally symmetric about the centreline X, and the centreline is linear and oriented perpendicularly to the bond surface 2, the above parameters apply to many different forms of the projection 3. For example, the projection 3 need not be rotationally symmetric and the conic sections of the base, tip and overhang may by replaced with pyramidal sections. The centreline need not be linear but may be curved, such as in the projections shown in FIG. 1. The centreline need not be oriented perpendicularly to the bond surface 2 at the point of intersection, but instead the centreline may form an oblique angle with the bond surface at this intersection.

Figure 3:
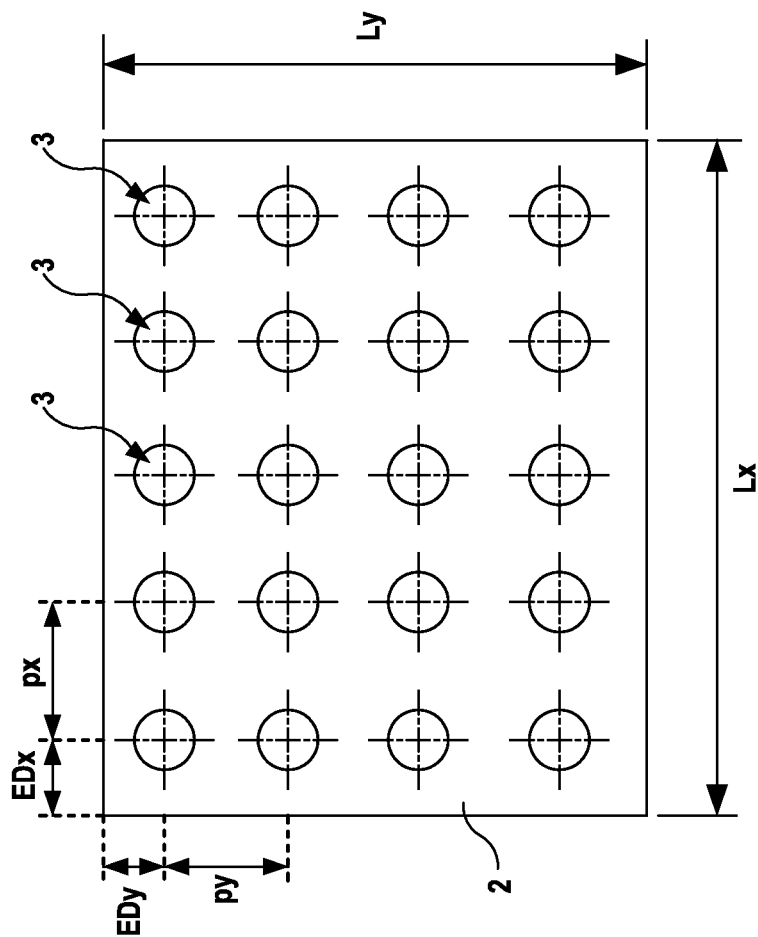
FIG. 3 illustrates an array of projections.

As shown in FIG. 3, the projections 3 are arranged on the bond surface 2 in a two-dimensional array in an x-y plane. FIG. 3 shows only a portion of the bond surface 2 having an edge length Lx in the x-direction and an edge length Ly in the y-direction. Only an outline of the footprint of the projections 3 on the bond surface 2 is shown in FIG. 3. The base of the projections are spaced from an edge of the component by a distance EDx in the x-direction and a distance EDy in the y-direction. The base of the projections are spaced apart by a pitch px in the x-direction and a pitch py in the y-direction.

Figure 4B:
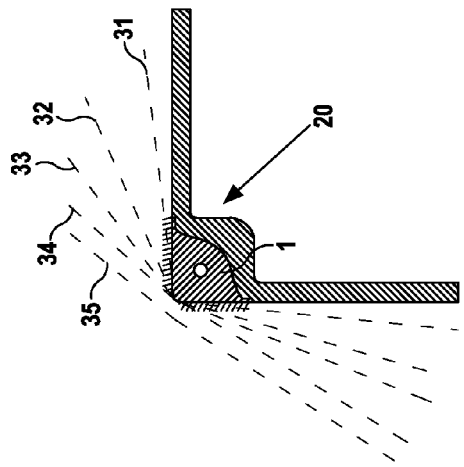
FIG. 4b illustrates a lay-up process by which successive plies are draped over the bracket and the tool.
Figure 4D:
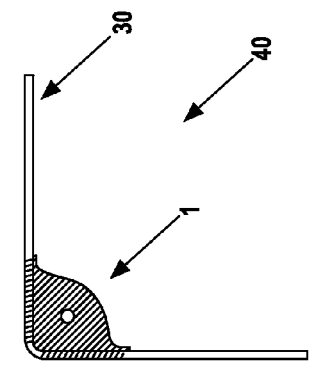
FIG. 4d illustrates the completed hybrid part after curing and de-moulding.
Figure 4A:
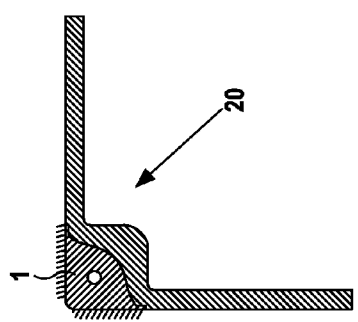
FIG. 4a illustrates the bracket component of FIG. 1 mounted in a recess in a mould tool.

Next, joining of the bracket component 1 to a laminate composite component 30 to form a hybrid part 40 will be described with reference to FIGS. 4a to 4d. The bracket component 1 is integrated into a mould tool 20 having a mould surface with a recess which receives the bracket component, as shown in FIG. 4a.

After the bracket component 1 has been integrated into the mould tool, a composite lay-up is laid over the bracket component 1 and the mould tool 20. The composite lay-up comprises a series of plies 31-35 of uni-axial carbon fibre, pre-impregnated with uncured epoxy resin. Each ply is conventionally known as a "prepreg". As shown in FIG. 4b, the initial prepreg 31 is penetrated by the projections 3 as the prepreg 31 is draped over the bond surface 2. The curvature of the projections 3 (shown in detail in FIG. 1) reduces the tendency for the projection 3 to tear laterally through the ply 31 during draping. Further plies 32-35 are draped successively over the bond surface 2 to complete the composite lay-up. A soft roller may be rolled over the prepregs 31-35 so that the projections 3 become fully embedded. The soft roller may be applied after each ply is laid, after a group of plies have been laid, or after the final ply has been laid.

Figure 4C:
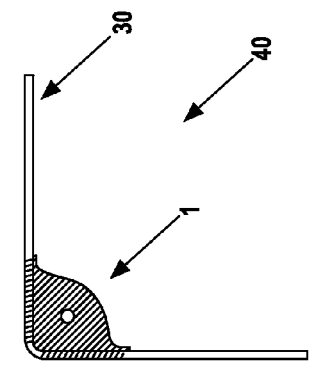
FIG. 4c illustrates the completed lay-up prior to cure.

FIG. 4c shows the completed ply lay-up of the second component 30 on the bracket 1 and the tool 20 ready for consolidation and curing of the prepregs by a so-called "vacuum bagging" process. That is, the lay-up is covered by a vacuum membrane (and optionally various other layers such as a breather layer or peel ply); the vacuum membrane is evacuated to apply consolidation pressure and extract moisture and volatiles; and the lay-up is heated (optionally in an autoclave) to cure the epoxy resin matrix. As the epoxy resin matrix melts prior to cure, it flows into intimate contact with the projections 3. The projections 3 mechanically engage with the matrix, while also increasing the surface area of the bond.

As a result of the curing process, the metallic bracket 1 (the first component) and the laminate composite component 30 (the second components) are joined to form a hybrid part 40 which is then removed from the mould tool 20. The hybrid part 40 is shown in FIG. 4d and may be assembled with various other components.

With reference once again to FIG. 2, the geometry of the projection 3 is such that the undercut surface 23 is inclined with respect to the local bond surface 2 and faces towards the local bond surface 2, which improves manufacturability (as will be discussed in greater detail below) and reduces stress concentrations in comparison with straight cut overhangs of the projections of the prior art. The pull-through strength of the joint between the first and second components is improved by the tapered overhang 22 as a result of removing stress concentrations in the region of the overhang.

The base 21 of the projection 3 is tapered towards the overhang 22. In this way, a "waist" of diameter Dn is formed where the bottom of the overhang 22 meets the top of the base 21. The value of Dn influences the tensile strength of the projection 3 (provided this is greater than Db, otherwise Db will dictate the tensile strength of the projection). The ratio DH/Dn influences the pull-through strength of the joint, due to failure in the second component. The ratio DH/Dn (which effectively defines the relative extent of the overhang) is preferably at least 1.2:1, and more preferably at least 1.5:1. The taper angle $\theta_1/2$ also influences the pull-through strength of the joint. If the taper angle $\theta_1/2$ is low then the pull-through strength of the joint will be low. If the taper angle $\theta_1/2$ is increased then the pull-through strength of the joint will increase up to the point where the overhang is so sharp that the effect of stress concentrations will limit the pull-through strength of the joint. The prior art projections with straight cut overhangs have an undercut surface parallel to the bond surface, so with a normal centreline they have a taper angle $\theta_1/2$ of 90 degrees (i.e. they are not tapered). Preferably, the taper angle $\theta_1/2$ is less than 80 degrees, more preferably is between 45 and 75 degrees, and most preferably is around 60 degrees. Accordingly, the profile of the protrusion can be optimised for pull-through strength. However, since the joint will typically experience load in multiple directions, it is generally not suitable to optimise the projection profile only for pull-through strength.

The taper angle $\theta_2/2$ influences the ease of assembly of the joint—a more pointed tip 20 (i.e. having a lower taper angle $\theta_2/2$) improving the ease of embedding the projections 3 into the second component. The value of Db influences the shear strength of the projection 3, and hence of the joint. The ratio Z/Db, the aspect ratio of the projection 3, influences the stiffness of the projection. The lower the aspect ratio, the stiffer the projection. A more flexible projection will have a higher aspect ratio. Typically, the aspect ratio varies between approximately 2 and 6. The aspect ratio of the projections may be increased or decreased to give the desired properties, but is preferably at least 2.

Figure 5:
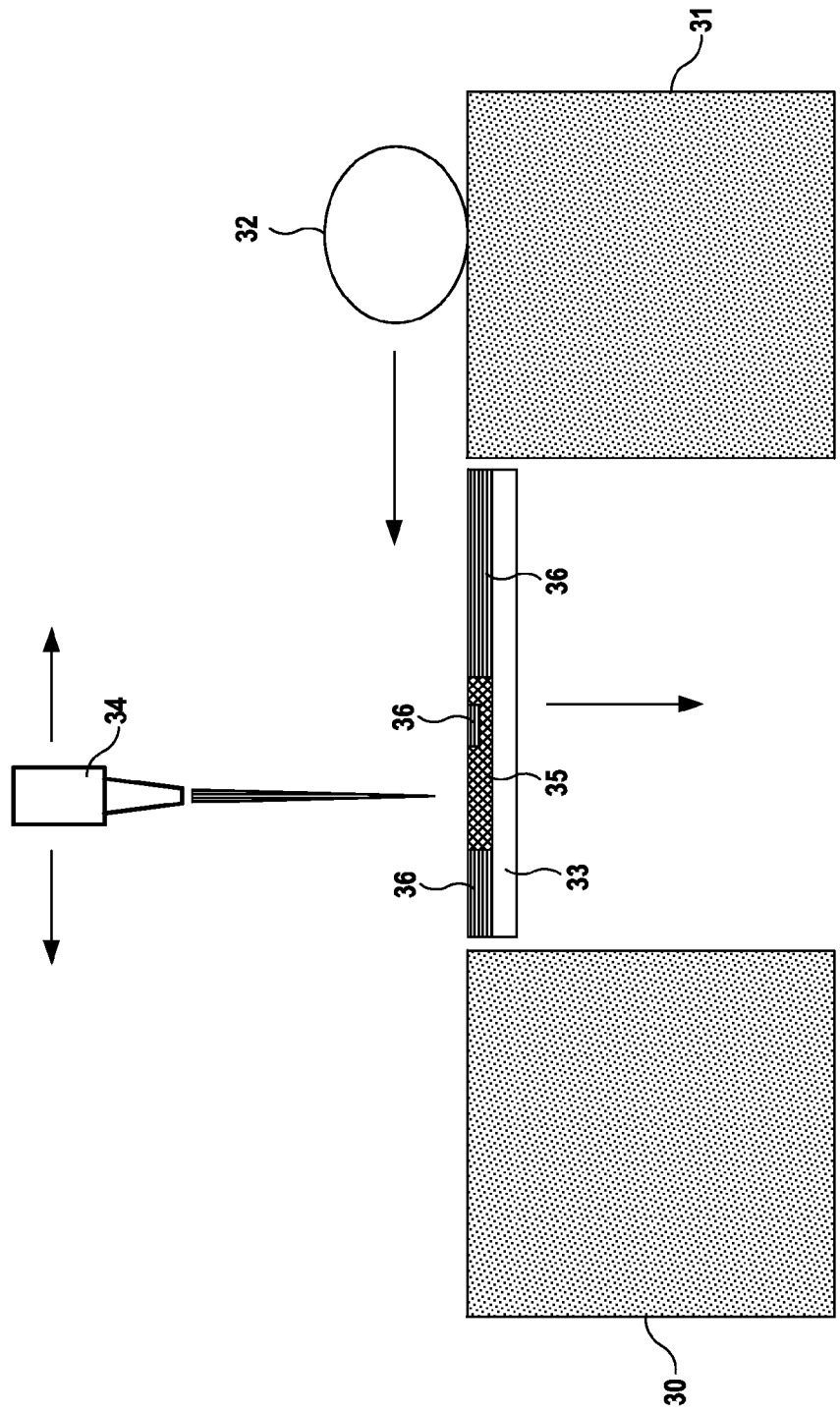
FIG. 5 illustrates a schematic view of a powder bed fabrication system.
Figure 6:
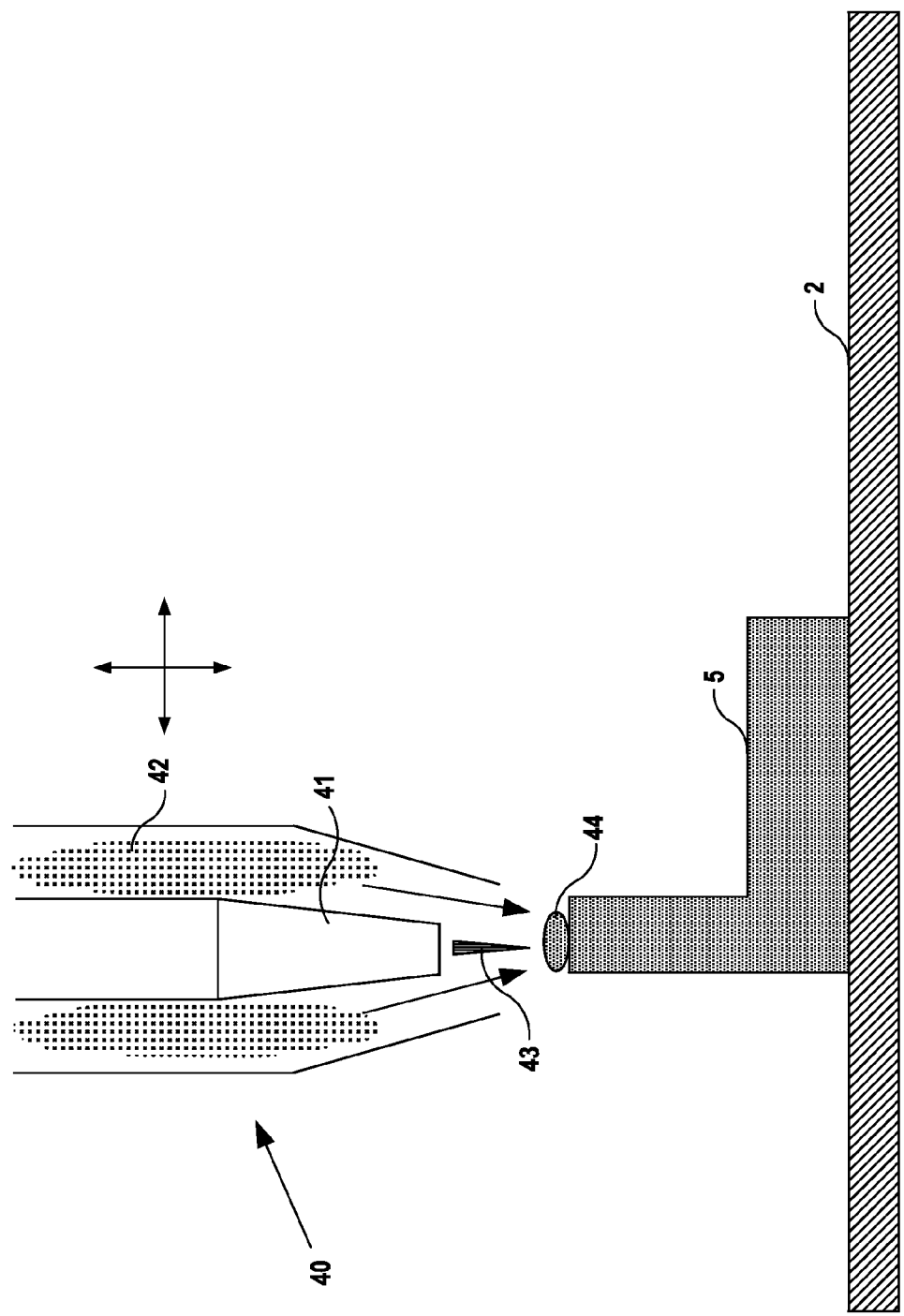
FIG. 6 illustrates a schematic view of a powder feed fabrication system.

Each projection 3 is grown in a series of layers by an additive manufacturing process: either a powder bed process as shown in FIG. 5, or a powder feed process as shown in FIG. 6.

In the powder bed process shown in FIG. 5, the array of projections is formed by scanning a laser head laterally across a powder bed and directing the laser to selected parts of the powder bed. More specifically, the system comprises a pair of feed containers 30, 31 containing powdered metallic material such as powdered Titanium. A roller 32 picks up powder from one of the feed containers (in the example of FIG. 5, the roller 32 is picking up powder from the right hand feed container) and rolls a continuous bed of powder over a support member 33. A laser head 34 then scans over the powder bed, and a laser beam from the head is turned on and off to melt the powder in a desired pattern. The support member 33 then moves down by a small distance (typically of the order of 0.1 mm) to prepare for growth of the next layer. After a pause for the melted powder to solidify, the roller 32 proceeds to roll another layer of powder over support member 33 in preparation for sintering. Thus as the process proceeds, a sintered part 35 is constructed, supported by unconsolidated powder parts 36. After the part has been completed, it is removed from support member 33 and the unconsolidated powder 36 is recycled before being returned to the feed containers 30, 31.

The powder bed system of FIG. 5 can be used to construct the entire bracket component 1, including projections 3. Movement of the laser head 34 and modulation of the laser beam is determined by a Computer Aided Design (CAD) model of the desired profile and layout of the part.

The powder feed fabrication system shown in FIG. 6 can be used to build up the projections 3 on a previously manufactured bracket component 1. That is, the bracket component 1 without the projections has been previously manufactured before being mounted in the powder feed fabrication mechanism.

A projection 3 is shown being built up on the bond surface 2 of one arm of the bracket component 1 in FIG. 6. The powder feed fabrication system comprises a movable head 40 with a laser 41 and an annular channel 42 around the laser 41. Un-sintered powder flows through the channel 42 into the focus of the laser beam 43. As the powder is deposited, it melts to form a bead 44 which becomes consolidated with the existing material.

The powder feed system may be used to grow the projections in series, or in parallel. More specifically, the projections may be grown in parallel by the following sequence:

P(1)L(1), P(2)L(1), . . . P(n)L(1),P(1)L(2),P(2)L(2) . . . P(n)L(2) . . . etc.

or in series by the following sequence:

P(1)L(1), P(1)L(2), . . . P(1)L(m),P(2)L(1),P(2)L(2), . . . P(2)L(m) . . . etc.

where P(X)L(Y) represents the growth of a layer X of a projection Y.

This can be contrasted with the powder bed system which can only grow the projections in parallel.

In contrast to the powder bed system of FIG. 5, the powder feed system of FIG. 6 directs powder to only the selected parts of the bond region, and fuses the powder as it is delivered. Therefore the powder feed mechanism produces structures that are unsupported by powder, and so supports (not shown) may need to be built integrally into the part and machined off later, in particular where the projections have large overhanging parts. Forming projections having straight cut overhangs normally requires such supports, even for small overhangs. However, the requirement for such supports is reduced, and so manufacturability is improved, by including the tapered overhang. If the ratio DH/Dn is small enough, no supports may be needed at all with the powder feed system. However, such supports will still be required where the ratio DH/Dn is larger.

The head 40 may be the only moving feature in the process, or the part may be rotated during fabrication. In other words, the head 40 directs powder to selected parts of the bond region with the part in a first orientation relative to the head 40; the part is rotated so that it adopts a second orientation relative to the head 40; and the head then directs material to selected parts of the bond region with the part in the second orientation. This facilitates the manufacturing of complex shapes without the need for removable supports. For instance overhanging features can be formed by rotating the part between layers in order to always ensure that the element being built is at no more than 30 degrees from the vertical. As the build area is at a temperature significantly below the melting point of the material, the area being built will only need to maintain a supportable angle for a brief time after the laser energy is removed in order for it to solidify enough to become self supporting. If the projections are built in a parallel sequence then it is possible to re-orientate the part between each layer to enable unsupported overhanging features to be built.

The laser source of either the powder bed or powder feed systems can be replaced by another power beam source, such as an electron beam source for directing an electron beam.

The second component may be a laminate component including a plurality of layers reinforced with glass or carbon fibres; or may be a thermoplastic layer without reinforcement, such as polyetheretherketone (PEEK). The projections may be formed from a metallic material (for instance Titanium or stainless steel); or a thermoplastic material such as polyetheretherketone (PEEK). The projections may be formed from the same material as the component or the flexible layer, or a different material.

The first component may take virtually any shape and have a bond surface that is planar, convex or concave. The first component 1 may include mounting features, such as fixing holes, so that the component may be mounted to other components in a final assembly.

Although the invention has been described above with reference to one or more preferred embodiments, it will be appreciated that various changes or modifications may be made without departing from the scope of the invention as defined in the appended claims.

The invention claimed is:

1. A joint comprising a first component and a second component,
    the first component comprising an array of projections extending from a bond surface of the first component, each projection having a base, a tapered tip and a tapered overhang beneath the tip, wherein a portion of the bond surface beneath each projection is a local bond surface for that projection, wherein the overhang has an undercut surface which is inclined and faces towards the local bond surface, and wherein the first and second components are joined together by the following steps:
    bringing the components together so as to embed the projections in the second component; and
    hardening the second component after the array of projections has been embedded into it.

2. A joint according to claim 1, wherein the first component is metallic.

3. A joint according to claim 1, wherein the second component is a fibre reinforced composite component.

4. A joint according to claim 1, wherein the second component is a laminated carbon fibre reinforced component.

* * * * *